(12) United States Patent
Plucinski

(10) Patent No.: US 12,452,234 B2
(45) Date of Patent: Oct. 21, 2025

(54) SYSTEMS AND METHODS FOR DIRECTING NETWORK TRAFFIC FROM THIRD-PARTY DOMAINS

(71) Applicant: Shopify Inc., Ottawa (CA)

(72) Inventor: Tomek Michal Plucinski, Halifax (CA)

(73) Assignee: Shopify Inc., Ottawa (CA)

( * ) Notice: Subject to any disclaimer, the term of this patent is extended or adjusted under 35 U.S.C. 154(b) by 463 days.

(21) Appl. No.: 18/156,745

(22) Filed: Jan. 19, 2023

(65) Prior Publication Data

US 2024/0250941 A1    Jul. 25, 2024

(51) Int. Cl.
*H04L 9/40*    (2022.01)

(52) U.S. Cl.
CPC ...... *H04L 63/0846* (2013.01); *H04L 63/0876* (2013.01)

(58) Field of Classification Search
CPC .................................................. H04L 63/0846
See application file for complete search history.

(56) References Cited

U.S. PATENT DOCUMENTS

| | | | |
|---|---|---|---|
| 11,102,239 B1* | 8/2021 | Sareshwala | H04L 63/166 |
| 2015/0150110 A1* | 5/2015 | Canning | H04L 63/0807 |
| | | | 726/9 |
| 2015/0278504 A1* | 10/2015 | Azim | H04W 12/065 |
| | | | 726/3 |

* cited by examiner

*Primary Examiner* — Simon P Kanaan
(74) *Attorney, Agent, or Firm* — Rowand LLP

(57) ABSTRACT

A server of a first tenant network domain receives one or more identifiers associated with a browser application that was used to access a webpage of the first tenant network domain. The server identifies, based on the one or more identifiers associated with the browser application, a likelihood that an active login cookie associated with a service network domain is stored by the browser application. If the likelihood exceeds a threshold, the server causes the browser application to be directed to a webpage on the service network domain that is associated with a logged-in state at the service network domain.

20 Claims, 9 Drawing Sheets

FIG. 4

SYSTEMS AND METHODS FOR DIRECTING NETWORK TRAFFIC FROM THIRD-PARTY DOMAINS

TECHNICAL FIELD

The present disclosure relates to directing network traffic across network domains.

BACKGROUND

Multi-tenant software-as-a-service (SaaS) providers operate services that support multiple different tenant network domains. Users may access a multi-tenant SaaS provider's service from each of these different tenant network domains. Since functionality of the service may be hosted by a service network domain that is different from the tenant network domains, a browser application accessing content from a tenant network domain is redirected to the service network domain in order to enable access to the service.

BRIEF DESCRIPTION OF THE DRAWINGS

Detailed descriptions of implementations of the present invention will be described and explained through the use of the accompanying drawings.

FIG. 4 illustrates an example home page of an administrator.

Figure 1:
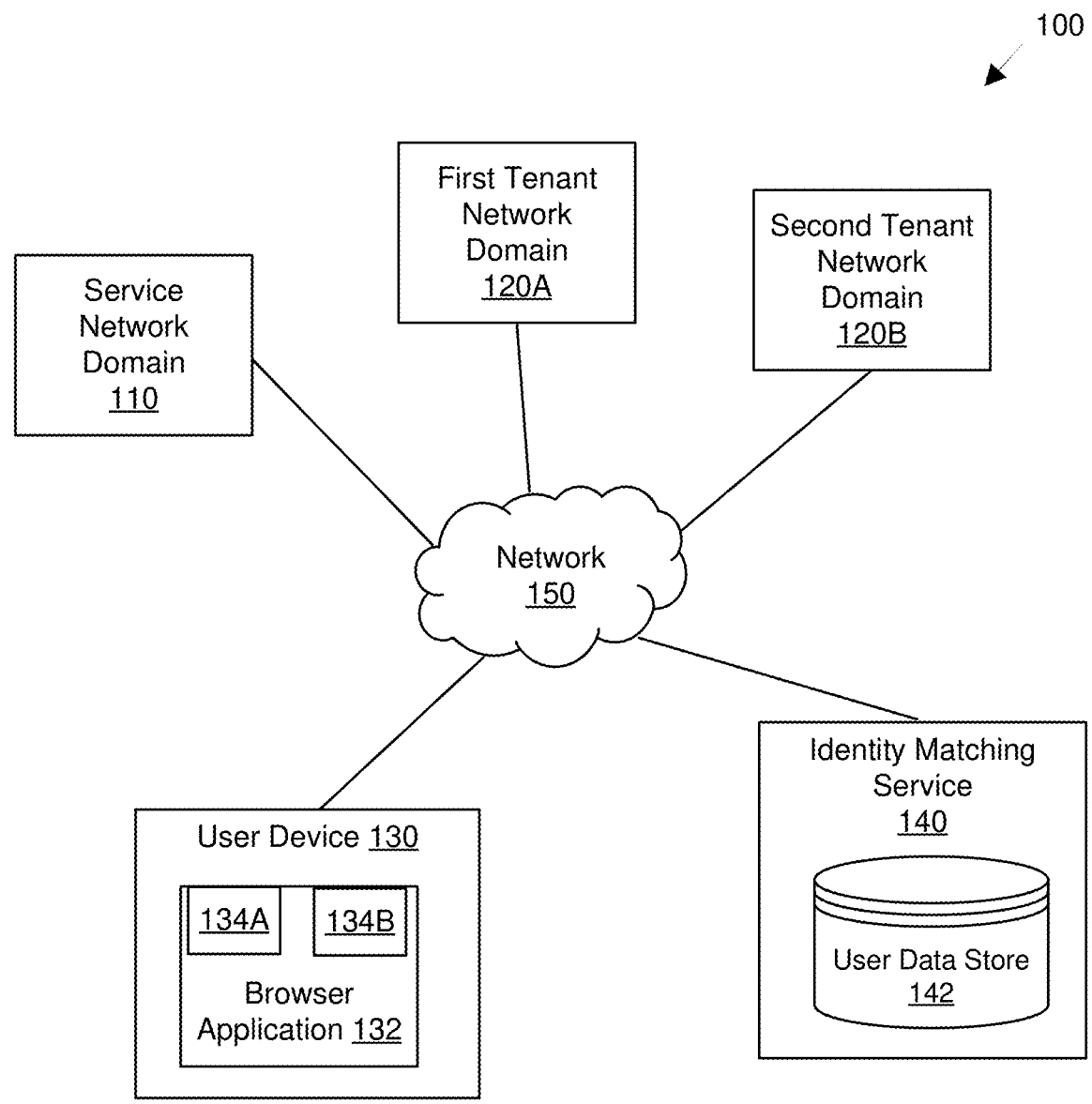
FIG. 1 is a block diagram illustrating an environment in which network traffic is redirected across different network domains, according to some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Browser applications typically store cookies to maintain information about user sessions associated with various network domains. Traditionally, these cookies include both first-party cookies, which are readable only by the network domain in which the cookie was created, and third-party cookies, which are readable by third-party domains as well as the domain in which the cookie was created. Third-party cookies have historically been used to pass information between different network domains. However, third-party cookies are often not available. For example, a particular browser application may not support third-party cookies, a user of the browser may opt out of third-party cookies, or a network domain may operate in a jurisdiction that does not permit third-party cookies.

A multi-tenant software-as-a-service (SaaS) configuration enables a service to be used across different tenant network domains. When a user requests access to the service from a first tenant network domain, the browser application used by the user directs the user to a service network domain where the user enters login credentials for the service network domain. The browser then stores a first-person login cookie, readable only by the service network domain, to maintain the user's login credentials. The service network domain can subsequently read the login credentials from the cookie to enable the user to access the service without needing to reenter the credentials. However, when the browser application accesses the service from a second tenant network domain, the user typically must log in to the service again from the second tenant domain because the second tenant network domain cannot read the first-party login cookie for the service network domain. To avoid such redundant steps, a server of a tenant network domain predicts whether a browser application accessing the tenant network domain is storing an active login cookie for the service network domain at the time the tenant domain is accessed.

According to implementations herein, a server of a first tenant network domain receives one or more identifiers associated with a browser application that was used to access a webpage of the first tenant network domain. The server identifies, based on the one or more identifiers associated with the browser application, a likelihood that an active login cookie associated with a service network domain is stored by the browser application. If the likelihood exceeds a threshold, the server causes the browser application to be directed to a webpage on the service network domain that is associated with a logged-in state at the service network domain.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Directing Network Traffic Across Network Domains

FIG. 1 is a block diagram illustrating an environment 100 in which network traffic is redirected across different network domains used by a multi-tenant SaaS provider, according to some implementations. As shown in FIG. 1, the environment 100 includes a service network domain 110, one or more tenant network domains 120, a user device 130, and an identity matching service 140, which communicate over a network 150 (such as the Internet). Other implementations of the environment 100 can include additional, fewer, or different entities.

The service network domain 110 represents a first set of services that are accessible by user devices or other network domains via the network 150. For example, one or more servers associated with the service network domain 110 provide a service for use in other network domains, such as the tenant network domains 120. An example type of service offered by the service network domain 110 is a payment processing service, in which a server associated with the service network domain completes a payment to a third party on behalf of a user of the payment processing service. Users use the payment processing service to complete transactions associated with third parties to improve security (e.g., because the users trust the payment processing service to securely handle financial account information) or for convenience (e.g., because users do not need to re-enter financial account information for each transaction). The service network domain 110 can provide other types of services in addition to or instead of payment processing services.

Users of the services provided by the service network domain 110 can each have a user account with the service network domain 110. The user account data includes one or more identifiers that are usable to identify a user's account at the service network domain. For example, the identifiers can include a telephone number for a mobile or landline telephone accessible to a user or an email address for an email account used by the user. The user account data can further include data applicable to a service provided by the service network domain 110. For example, when the service network domain 110 provides payment processing services, the domain further stores information such as one or more payment methods linked to the account (e.g., credit or debit card numbers, bank account numbers, or credentials for a third-party payment processing service), a billing address for the linked payment method(s), and/or a shipping address where the associated user receives shipments of physical goods.

One or more tenant network domains 120 each represent a second set of services that are accessible by user devices or other network domains via the network 150. For example, each tenant network domain 120 includes one or more webpages. Users can have accounts with a tenant network domain 120 that are different from the user accounts associated with the service network domain. In an example, a first tenant network domain 120A and a second tenant network domain 120B are each online storefronts that users can browse to purchase various goods or services. The user account with each online storefront includes data such as past purchases by the user, rewards points collected by the user based on the past purchases, or browsing history of the user within the corresponding storefront.

The user device 130 is a device used to access content from the network domains 110, 120. The user device 130 can include, for example, a personal computer (PC), tablet computer, mobile telephone, game console, music player, wearable electronic device, network-connected ("smart") device (e.g., a television or home assistant device), AR/VR systems (e.g., head-mounted display), or any other device capable of transmitting or receiving data over a network. In some implementations, the user device 130 executes a browser application 132 that is configured to access and render for display webpages from the service network domain 110 and/or tenant network domains 120.

As the browser application 132 accesses webpages from various network domains, the browser application stores cookies 134 to maintain information such as login credentials for an account associated with a corresponding network domain or activity performed on the network domain. Such data can be stored as first-party cookies, which are readable only by the domain in which the cookie was created. For example, FIG. 1 depicts the browser application 132 storing a first-party cookie 134A for the service network domain 110 (based on prior interaction with the service network domain 110) and a first-party cookie 134B for the first tenant network domain 120A (based on prior interaction with the first tenant network domain 120A). When the browser 132 is accessing content of the first tenant network domain 120A, for example, the first tenant network domain can read the cookie 134B but not the cookie 134A because the cookie 134A is a third-party cookie relative to the first tenant network domain 120A.

Activity performed by the browser application 132 on different network domains can be stored in respective first-party cookies. As an example, when a user logs into the service provided by the service network domain 110, the browser application 132 stores a first-party cookie maintaining the user's login credentials to the service network domain 110. While this login cookie is active (e.g., before the cookie is deleted from the browser and before the cookie expires), the service network domain 110 can retrieve the user's login credentials from the cookie in order to display content that is associated with a logged-in state at the service network domain, without the user re-entering credentials each time the user accesses the service. When a visitor to the tenant network domains 120 accesses the service of the service network domain, some portions of a process for accessing the service are performed on the tenant network domains. For example, the tenant network domain may need to determine whether to direct the browser application to a login page for the service network domain or to a webpage associated with a logged-in state at the service network domain. However, since the service domain login cookie is not readable by the tenant network domains 120, the tenant network domains cannot use the service domain login cookie to determine whether the user is logged in to the service network domain, and thus whether to direct the browser application to content associated with a logged-in state or a logged-out state at the service network domain.

The identity matching service 140 matches identifiers across different network domains to enable expedited login to the service network domain 110. The identity matching service 140 can be operated by a server associated with any of the network domains 110, 120 or by an external system in communication with the network domain 110, 120 servers. As browser applications access the service network domain from tenant network domains 120, the identity matching service 140 receives various identifiers associated with a corresponding user, the browser application, or the user device executing the browser application. For example, when a user logs into the service network domain from a browser application accessing a tenant network domain, the identity matching service 140 receives an Internet Protocol (IP) address of a user device executing the browser application, an identifier of the browser application (e.g., a user-client string), or an identifier associated with a user account active on the tenant network domain (e.g., a user identifier such as a telephone number or an email address). The identity matching service 140 stores the received identifiers in a user data store 142. Subsequently, when a browser application accesses another tenant network domain 120, the identity matching service 140 predicts whether the browser application 132 is likely to be storing a login cookie for the service network domain based on the identifiers in the user data store 142. A process for predicting whether a service network login cookie is stored at a browser application, and directing network traffic based on the prediction, is described with respect to FIG. 2.

Figure 2:
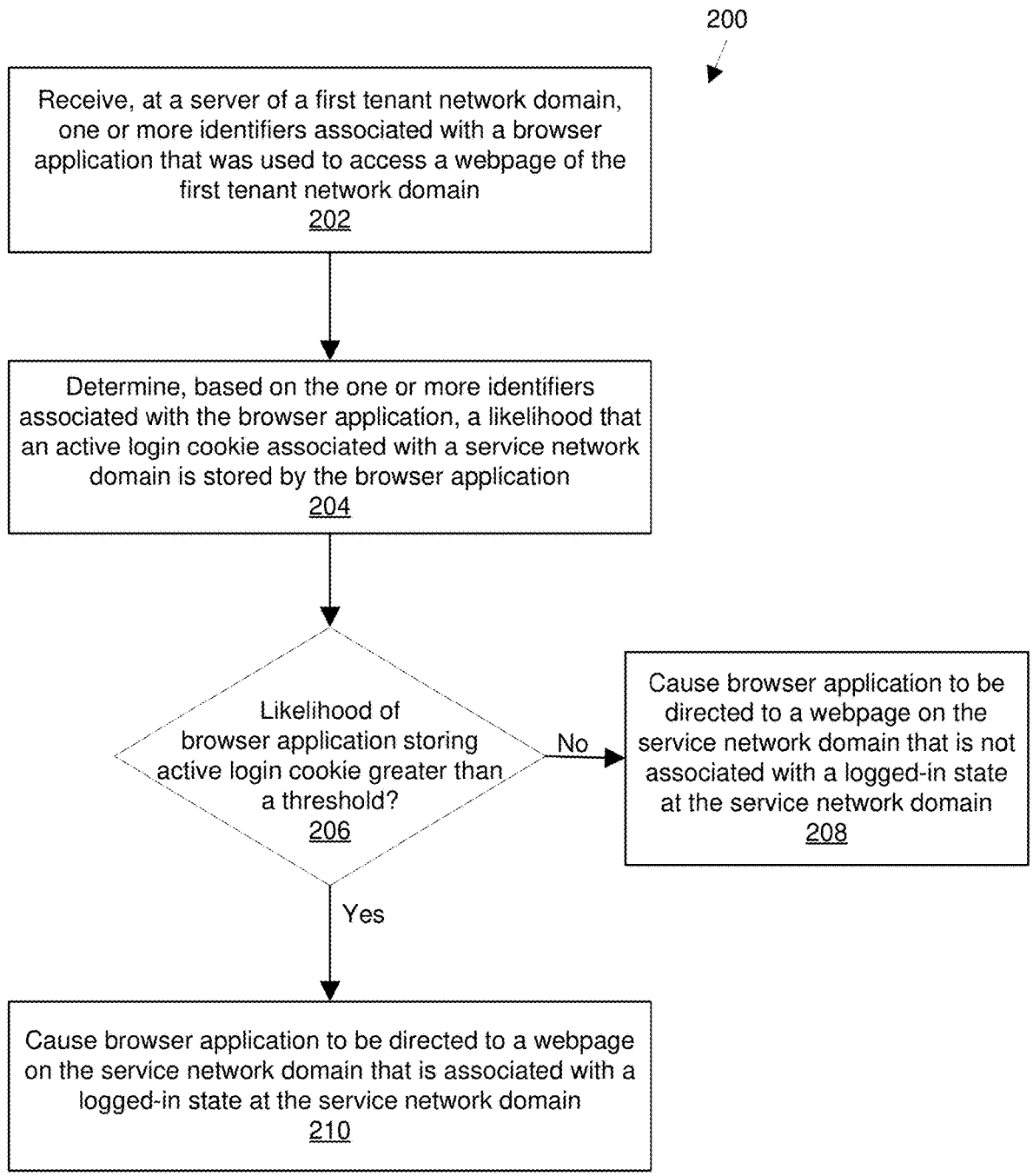
FIG. 2 is a flowchart illustrating a process for directing traffic from third-party network domains, according to some implementations.

FIG. 2 is a flowchart illustrating a process 200 for directing traffic from third-party network domains, according to some implementations. The process 200 can be performed by a server associated with the first tenant network domain 120. Other implementations of the process 200 include additional, fewer, or different steps, or perform the steps in different orders.

At 202, the server of the first tenant network domain receives one or more identifiers associated with a browser application that was used to access a webpage of the first tenant network domain. For example, when the browser application accesses the webpage, the server receives a user-client string associated with the browser application or an IP address of the user device executing the browser application. The user may also log into an account with the first tenant network domain, which may store user identifiers such as a telephone number or an email address. The server can accordingly retrieve such user identifiers from the user account.

Based on the one or more identifiers associated with the browser application, the server determines, at 204, a likelihood that an active login cookie associated with a service network domain is stored by the browser application. In some implementations, the server determines the likelihood by accessing a data repository that stores identifiers received from activity on at least a second tenant network domain (such as the user data store 142 maintained by the identity matching server 140). For example, the server determines whether a user-client string associated with the browser application matches a user-client string captured from an earlier data session on the second tenant network domain and stored in the data repository. To determine the likelihood of the browser application storing a service domain login cookie, some implementations of the server search for an exact match between an identifier received from the browser's activity on the first tenant network domain and an identifier stored in the data repository, determining the browser is likely storing a login cookie when a match is found and determining the browser is not likely storing the cookie when no match is found. In other implementations, the server determines a likelihood based on a degree of match between a plurality of identifiers associated with the browser application and identifiers in the data repository. Such a degree of match can represent, for example, a number of the plurality of received identifiers that match corresponding identifiers in the data repository. The degree of match can be weighted in some implementations based on a degree of certainty that a given type of identifier is indicative of a login cookie being stored at the browser. For example, if a matching telephone number is found in the data repository, the server can determine there is a low likelihood that the browser used to access the first tenant network domain is storing an active login cookie for the service network domain, since the telephone number may be used by multiple users or by a user who accesses the service network from different browsers or different user devices. On the other hand, if a matching user-client string is found in the data repository, the server determines there is a high likelihood that the same browser application was previously used to log into the service network domain.

In some cases, after identifying a match between one or more identifiers associated with the browser application and one or more stored identifiers, thus predicting that the browser application has likely stored a login cookie for the service network domain at some time in the past, the server further predicts a likelihood that the prior login cookie is still active at the time the browser application is used to access the first tenant network domain. To predict whether the prior login cookie for the service network domain remains active, the server predicts a time that the prior login cookie was likely stored to the browser application. For example, the server predicts the prior login cookie was stored to the browser application at a time of a first access of a webpage on the second tenant network domain. The server also determines an amount of time a cookie is expected to be active, for example based on a cookie expiration policy of the service network domain or based on browser applications' average retention time for cookies. Based on the predicted time of storage and the amount of time the cookie is expected to be active, the server estimates a time of expiration for the login cookie. If the estimated time of expiration has not yet passed at the time the browser application is used to access the first tenant network domain, the server predicts that the login cookie stored in the browser is still active.

At 206, the server determines whether the likelihood of the browser application storing an active login cookie for the service network domain is greater than a threshold.

When the server determines the browser application is not likely to be storing an active login cookie, the server at 208 directs the browser application to a webpage that is not associated with a logged-in state at the service network domain, such as a webpage to enable login to the service network domain. For example, the server directs the browser to a login webpage associated with the service network domain or causes the browser to display an interface element that is selectable to access the login webpage. By directing to the webpage associated with a logged-out state when the likelihood of an active login cookie is below the threshold, the server reduces the potential number of redirects of the browser application. For example, if the server directs the browser application to a webpage associated with a logged-in state at the service network domain when the browser does not have an active login cookie for the service network domain, the browser will be redirected back to the first tenant network domain. Such redirects affect the reputation of the first tenant network domain and may cause the browser application to delete cookies (as a consequence of, e.g., the first tenant network domain being classified as a tracker and/or the browser application having "redirect tracking protection" or "bounce tracking" features).

When the likelihood that the browser application is storing an active login cookie for the service network domain is determined at 206 to exceed the threshold, the server causes the browser application to be directed, at 210, to a webpage on the service network domain that is associated with a logged-in state at the service network domain.

By directing the browser application to the webpage on the service network domain that is associated with the logged-in state at the service network domain, the server of the first tenant network domain facilitates seamless login to the service without requiring users to complete redundant login steps. The process shown in FIG. 2 performs such seamless cross-domain login without a need for third-party cookies, while reducing the expected number of browser redirects.

An Example E-commerce Platform

An example use case of the network traffic redirection techniques described above implement these methods in a commerce environment, such as that associated with an e-commerce platform, in which the tenant network domains provide online stores and the service network domain provides a service to the online stores. Therefore, an example of a commerce platform will be described.

Figure 3:
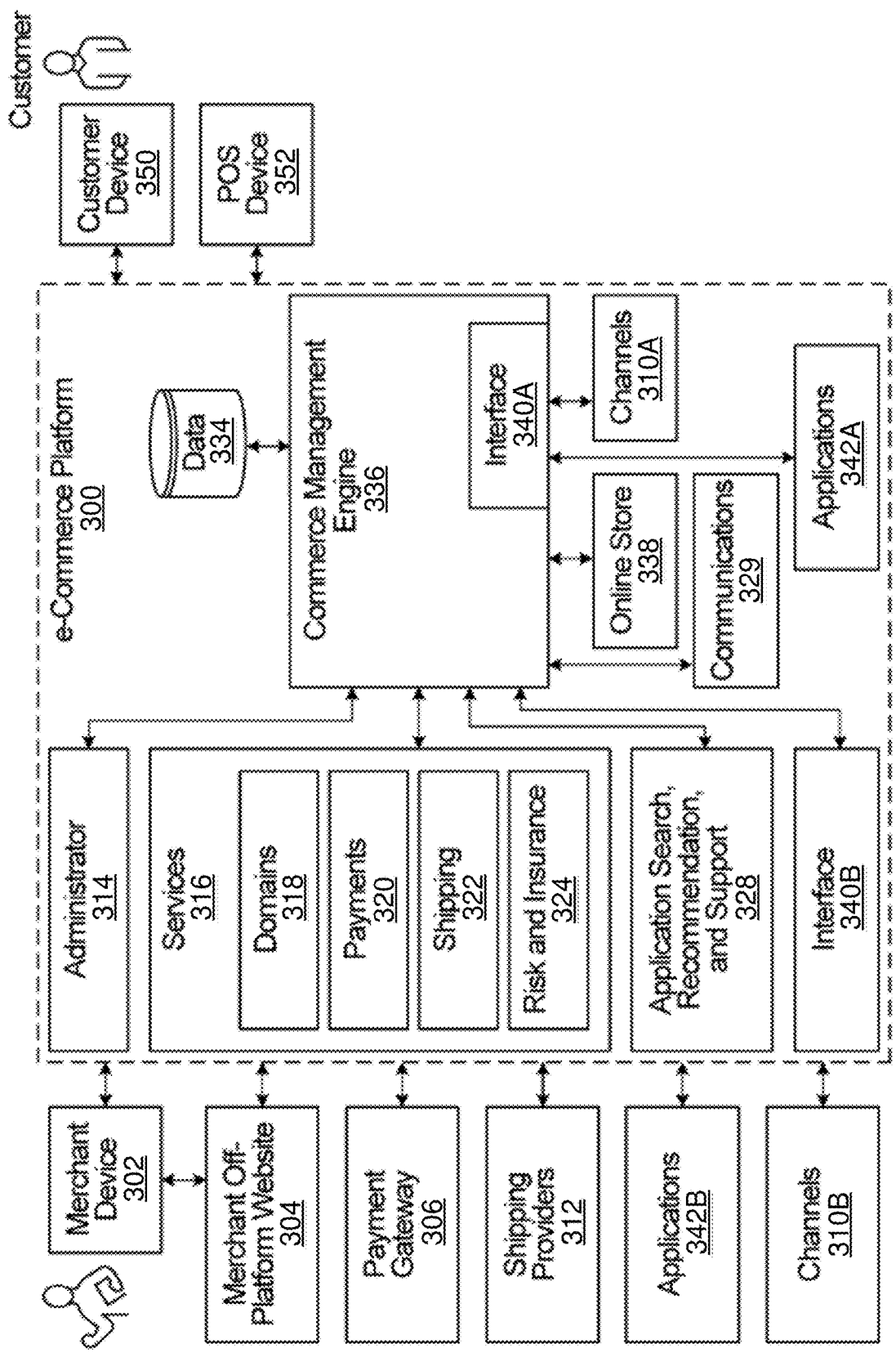
FIG. 3 illustrates an example e-commerce platform, according to some implementations.

FIG. 3 illustrates an example e-commerce platform 300, according to one embodiment. The e-commerce platform 300 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 300 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 300 for potential use in marketing and selling products, and the like), a service provider user (e.g., a shipping provider 312, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 300 provides merchants with online services/facilities to manage their business. The facilities described herein are shown implemented as part of the platform 300 but could also be configured separately from the platform 300, in whole or in part, as stand-alone services. Furthermore, such facilities may, in some embodiments, may, additionally or alternatively, be provided by one or more providers/entities.

In the example of FIG. 3, the facilities are deployed through a machine, service or engine that executes computer software, modules, program codes, and/or instructions on one or more processors which, as noted above, may be part of or external to the platform 300. Merchants may utilize the e-commerce platform 300 for enabling or managing commerce with customers, such as by implementing an e-commerce experience with customers through an online store 338, applications 342A-B, channels 310A-B, and/or through point of sale (POS) devices 352 in physical locations (e.g., a physical storefront or other location such as through a kiosk, terminal, reader, printer, 3D printer, and the like). A merchant may utilize the e-commerce platform 300 as a sole commerce presence with customers, or in conjunction with other merchant commerce facilities, such as through a physical store (e.g., brick-and-mortar retail stores), a merchant off-platform website 304 (e.g., a commerce Internet website or other internet or web property or asset supported by or on behalf of the merchant separately from the e-commerce platform 300), an application 342B, and the like. However, even these 'other' merchant commerce facilities may be incorporated into or communicate with the e-commerce platform 300, such as where POS devices 352 in a physical store of a merchant are linked into the e-commerce platform 300, where a merchant off-platform website 304 is tied into the e-commerce platform 300, such as, for example, through 'buy buttons' that link content from the merchant off platform website 304 to the online store 338, or the like.

The online store 338 may represent a multi-tenant facility comprising a plurality of virtual storefronts. In embodiments, merchants may configure and/or manage one or more storefronts in the online store 338, such as, for example, through a merchant device 302 (e.g., computer, laptop computer, mobile computing device, and the like), and offer products to customers through a number of different channels 310A-B (e.g., an online store 338; an application 342A-B; a physical storefront through a POS device 352; an electronic marketplace, such, for example, through an electronic buy button integrated into a website or social media channel such as on a social network, social media page, social media messaging system; and/or the like). A merchant may sell across channels 310A-B and then manage their sales through the e-commerce platform 300, where channels 310A may be provided as a facility or service internal or external to the e-commerce platform 300. A merchant may, additionally or alternatively, sell in their physical retail store, at pop ups, through wholesale, over the phone, and the like, and then manage their sales through the e-commerce platform 300. A merchant may employ all or any combination of these operational modalities. Notably, it may be that by employing a variety of and/or a particular combination of modalities, a merchant may improve the probability and/or volume of sales. Throughout this disclosure the terms online store 338 and storefront may be used synonymously to refer to a merchant's online e-commerce service offering through the e-commerce platform 300, where an online store 338 may refer either to a collection of storefronts supported by the e-commerce platform 300 (e.g., for one or a plurality of merchants) or to an individual merchant's storefront (e.g., a merchant's online store).

In some embodiments, a customer may interact with the platform 300 through a customer device 350 (e.g., computer, laptop computer, mobile computing device, or the like), a POS device 352 (e.g., retail device, kiosk, automated (self-service) checkout system, or the like), and/or any other commerce interface device known in the art. The e-commerce platform 300 may enable merchants to reach customers through the online store 338, through applications 342A-B, through POS devices 352 in physical locations (e.g., a merchant's storefront or elsewhere), to communicate with customers via electronic communication facility 329, and/or the like so as to provide a system for reaching customers and facilitating merchant services for the real or virtual pathways available for reaching and interacting with customers.

In some embodiments, and as described further herein, the e-commerce platform 300 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 300 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 300, merchant devices 302, payment gateways 306, applications 342A-B, channels 310A-B, shipping providers 312, customer devices 350, point of sale devices 352, etc. In some implementations, the processing facility may be or may include one or more such computing devices acting in concert. For example, it may be that a plurality of co-operating computing devices serves as/to provide the processing facility. The e-commerce platform 300 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 338) is provided as a service, and is centrally hosted (e.g., and then accessed by users via a web browser or other application, and/or through customer devices 350, POS devices 352, and/or the like). In some embodiments, elements of the e-commerce platform 300 may be implemented to operate and/or integrate with various other platforms and operating systems.

In some embodiments, the facilities of the e-commerce platform 300 (e.g., the online store 338) may serve content to a customer device 350 (using data 334) such as, for example, through a network connected to the e-commerce platform 300. For example, the online store 338 may serve or send content in response to requests for data 334 from the customer device 350, where a browser (or other application) connects to the online store 338 through a network using a network communication protocol (e.g., an internet protocol). The content may be written in machine readable language and may include Hypertext Markup Language (HTML), template language, JavaScript, and the like, and/or any combination thereof.

In some embodiments, online store 338 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 338 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 338, such as through blogs, articles, landing pages, and the like, as well as configure navigation menus. Merchants may upload images (e.g., for products), video, content, data, and the like to the e-commerce platform 300, such as for storage by the system (e.g., as data 334). In some embodiments, the e-commerce platform 300 may provide functions for manipulating such images and content such as, for example, functions for resizing images, associating an image with a product, adding and associating text with an image, adding an image for a new product variant, protecting images, and the like.

As described herein, the e-commerce platform 300 may provide merchants with sales and marketing services for products through a number of different channels 310A-B, including, for example, the online store 338, applications 342A-B, as well as through physical POS devices 352 as described herein. The e-commerce platform 300 may, additionally or alternatively, include business support services 316, an administrator 314, a warehouse management system, and the like associated with running an on-line business, such as, for example, one or more of providing a domain registration service 318 associated with their online store, payment services 320 for facilitating transactions with a customer, shipping services 322 for providing customer shipping options for purchased products, fulfillment services for managing inventory, risk and insurance services 324 associated with product protection and liability, merchant billing, and the like. Services 316 may be provided via the e-commerce platform 300 or in association with external facilities, such as through a payment gateway 306 for payment processing, shipping providers 312 for expediting the shipment of products, and the like.

In some embodiments, the e-commerce platform 300 may be configured with shipping services 322 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 4:
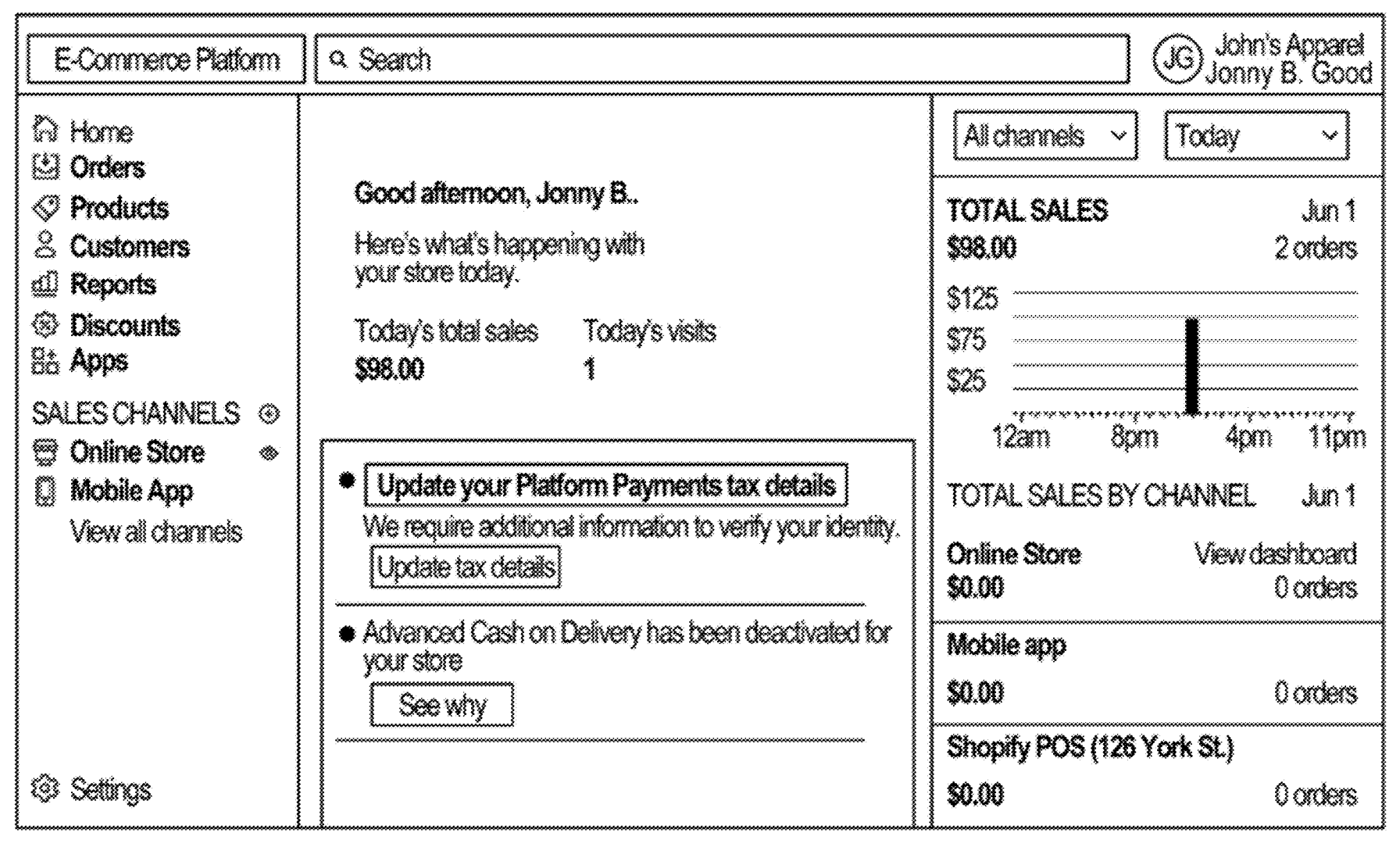

FIG. 4 depicts a non-limiting embodiment for a home page of an administrator 314. The administrator 314 may be referred to as an administrative console and/or an administrator console. The administrator 314 may show information about daily tasks, a store's recent activity, and the next steps a merchant can take to build their business. In some embodiments, a merchant may log in to the administrator 314 via a merchant device 302 (e.g., a desktop computer or mobile device), and manage aspects of their online store 338, such as, for example, viewing the online store's 338 recent visit or order activity, updating the online store's 338 catalog, managing orders, and/or the like. In some embodiments, the merchant may be able to access the different sections of the administrator 314 by using a sidebar, such as the one shown on FIG. 4. Sections of the administrator 314 may include various interfaces for accessing and managing core aspects of a merchant's business, including orders, products, customers, available reports and discounts. The administrator 314 may, additionally or alternatively, include interfaces for managing sales channels for a store including the online store 338, mobile application(s) made available to customers for accessing the store (Mobile App), POS devices, and/or a buy button. The administrator 314 may, additionally or alternatively, include interfaces for managing applications (apps) installed on the merchant's account; and settings applied to a merchant's online store 338 and account. A merchant may use a search bar to find products, pages, or other information in their store.

More detailed information about commerce and visitors to a merchant's online store 338 may be viewed through reports or metrics. Reports may include, for example, acquisition reports, behavior reports, customer reports, finance reports, marketing reports, sales reports, product reports, and custom reports. The merchant may be able to view sales data for different channels 310A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 338, such as based on account status, growth, recent customer activity, order updates, and the like. Notifications may be provided to assist a merchant with navigating through workflows configured for the online store 338, such as, for example, a payment workflow, an order fulfillment workflow, an order archiving workflow, a return workflow, and the like.

The e-commerce platform 300 may provide for a communications facility 329 and associated merchant interface for providing electronic communications and marketing, such as utilizing an electronic messaging facility for collecting and analyzing communication interactions between merchants, customers, merchant devices 302, customer devices 350, POS devices 352, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 329 is configured to provide automated responses to customer requests and/or provide recommendations to the merchant on how to respond such as, for example, to improve the probability of a sale.

The e-commerce platform 300 may provide a financial facility 320 for secure financial transactions with customers, such as through a secure card server environment. The e-commerce platform 300 may store credit card information, such as in payment card industry data (PCI) environments (e.g., a card server), to reconcile financials, bill merchants, perform automated clearing house (ACH) transfers between the e-commerce platform 300 and a merchant's bank account, and the like. The financial facility 320 may also provide merchants and buyers with financial support, such as through the lending of capital (e.g., lending funds, cash advances, and the like) and provision of insurance. In some embodiments, online store 338 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 300. In some embodiments, the e-commerce platform 300 may store this data in a data facility 334. Referring again to FIG. 3, in some embodiments the e-commerce platform 300 may include a commerce management engine 336 such as may be configured to perform various workflows for task automation or content management related to products, inventory, customers, orders, suppliers, reports, financials, risk and fraud, and the like. In some embodiments, additional functionality may, additionally or alternatively, be provided through applications 342A-B to enable greater flexibility and customization required for accommodating an ever-growing variety of online stores, POS devices, products, and/or services. Applications 342A may be components of the e-commerce platform 300 whereas applications 342B may be provided or hosted as a third-party service external to e-commerce platform 300. The commerce management engine 336 may accommodate store-specific workflows and in some embodiments, may incorporate the administrator 314 and/or the online store 338.

Implementing functions as applications 342A-B may enable the commerce management engine 336 to remain responsive and reduce or avoid service degradation or more serious infrastructure failures, and the like.

Although isolating online store data can be important to maintaining data privacy between online stores 338 and merchants, there may be reasons for collecting and using cross-store data, such as for example, with an order risk assessment system or a platform payment facility, both of which require information from multiple online stores 338 to perform well. In some embodiments, it may be preferable to move these components out of the commerce management engine 336 and into their own infrastructure within the e-commerce platform 300.

Platform payment facility 320 is an example of a component that utilizes data from the commerce management engine 336 but is implemented as a separate component or service. The platform payment facility 320 may allow customers interacting with online stores 338 to have their payment information stored safely by the commerce management engine 336 such that they only have to enter it once. When a customer visits a different online store 338, even if they have never been there before, the platform payment facility 320 may recall their information to enable a more rapid and/or potentially less-error prone (e.g., through avoidance of possible mis-keying of their information if they needed to instead re-enter it) checkout. This may provide a cross-platform network effect, where the e-commerce platform 300 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 338.

For functions that are not included within the commerce management engine 336, applications 342A-B provide a way to add features to the e-commerce platform 300 or individual online stores 338. For example, applications 342A-B may be able to access and modify data on a merchant's online store 338, perform tasks through the administrator 314, implement new flows for a merchant through a user interface (e.g., that is surfaced through extensions/API), and the like. Merchants may be enabled to discover and install applications 342A-B through application search, recommendations, and support 328. In some embodiments, the commerce management engine 336, applications 342A-B, and the administrator 314 may be developed to work together. For instance, application extension points may be built inside the commerce management engine 336, accessed by applications 342A and 342B through the interfaces 340B and 340A to deliver additional functionality, and surfaced to the merchant in the user interface of the administrator 314.

In some embodiments, applications 342A-B may deliver functionality to a merchant through the interface 340A-B, such as where an application 342A-B is able to surface transaction data to a merchant (e.g., App: "Engine, surface my app data in the Mobile App or administrator 314"), and/or where the commerce management engine 336 is able to ask the application to perform work on demand (Engine: "App, give me a local tax calculation for this checkout").

Applications 342A-B may be connected to the commerce management engine 336 through an interface 340A-B (e.g., through REST (REpresentational State Transfer) and/or GraphQL APIs) to expose the functionality and/or data available through and within the commerce management engine 336 to the functionality of applications. For instance, the e-commerce platform 300 may provide API interfaces 340A-B to applications 342A-B which may connect to products and services external to the platform 300. The flexibility offered through use of applications and APIs (e.g., as offered for application development) enable the e-commerce platform 300 to better accommodate new and unique needs of merchants or to address specific use cases without requiring constant change to the commerce management engine 336. For instance, shipping services 322 may be integrated with the commerce management engine 336 through a shipping or carrier service API, thus enabling the e-commerce platform 300 to provide shipping service functionality without directly impacting code running in the commerce management engine 336.

Depending on the implementation, applications 342A-B may utilize APIs to pull data on demand (e.g., customer creation events, product change events, or order cancelation events, etc.) or have the data pushed when updates occur. A subscription model may be used to provide applications 342A-B with events as they occur or to provide updates with respect to a changed state of the commerce management engine 336. In some embodiments, when a change related to an update event subscription occurs, the commerce management engine 336 may post a request, such as to a predefined callback URL. The body of this request may contain a new state of the object and a description of the action or event. Update event subscriptions may be created manually, in the administrator facility 314, or automatically (e.g., via the API 340A-B). In some embodiments, update events may be queued and processed asynchronously from a state change that triggered them, which may produce an update event notification that is not distributed in real-time or near-real time.

In some embodiments, the e-commerce platform 300 may provide one or more of application search, recommendation and support 328. Application search, recommendation and support 328 may include developer products and tools to aid in the development of applications, an application dashboard (e.g., to provide developers with a development interface, to administrators for management of applications, to merchants for customization of applications, and the like), facilities for installing and providing permissions with respect to providing access to an application 342A-B (e.g., for public access, such as where criteria must be met before being installed, or for private use by a merchant), application searching to make it easy for a merchant to search for applications 342A-B that satisfy a need for their online store 338, application recommendations to provide merchants with suggestions on how they can improve the user experience through their online store 338, and the like. In some embodiments, applications 342A-B may be assigned an application identifier (ID), such as for linking to an application (e.g., through an API), searching for an application, making application recommendations, and the like.

Applications 342A-B may be grouped roughly into three categories: customer-facing applications, merchant-facing applications, integration applications, and the like. Customer-facing applications 342A-B may include an online store 338 or channels 310A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 342A-B may include applications that allow the merchant to administer their online store 338 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 312 and payment gateways 306.

As such, the e-commerce platform 300 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 310A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 310A-B such as, for example, the merchant's online store 338, a physical storefront through a POS device 352; an electronic marketplace, through an electronic buy button integrated into a website or a social media channel). In some cases, channels 310A-B may be modeled as applications 342A-B A merchandising component in the commerce management engine 336 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 4D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 336 may be configured to receive customer information to complete the order such as the customer's contact information, billing information and/or shipping details. If the customer inputs their contact information but does not proceed to payment, the e-commerce platform 300 may (e.g., via an abandoned checkout component) to transmit a message to the customer device 350 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 336 may be configured to communicate with various payment gateways and services 306 (e.g., online payment systems, mobile payment systems, digital wallets, credit card gateways) via a payment processing component. The actual interactions with the payment gateways 306 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 336 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 336 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 336. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 300 may make the merchant aware of compliance issues with respect to legal obligations (e.g., with respect to taxes). In some embodiments, the e-commerce platform 300 may enable merchants to keep track of changes to the contract of sales over time, such as implemented through a sales model component (e.g., an append-only date-based ledger that records sale-related events that happened to an item).

Implementation in an E-commerce Platform

Figure 5:
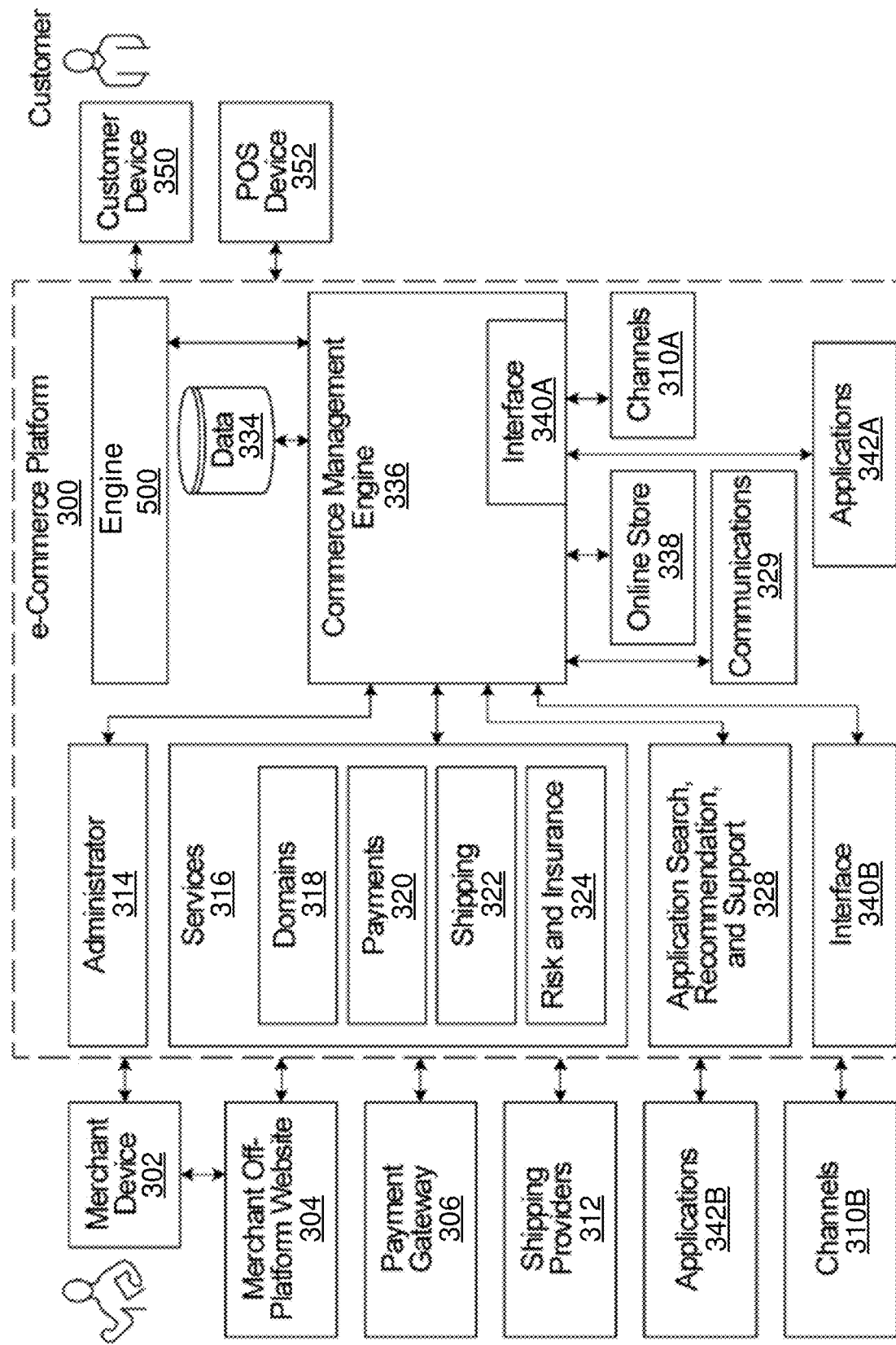
FIG. 5 illustrates another implementation of an e-commerce platform.

The functionality described herein may be used in commerce to provide improved customer or buyer experiences. The e-commerce platform 300 could implement the functionality for any of a variety of different applications, examples of which are described elsewhere herein. FIG. 5 illustrates the e-commerce platform 300 of FIG. 3 but including an engine 500. The engine 500 is an example of a computer-implemented system that implements the functionality described herein for use by the e-commerce platform 300, the customer device 350 and/or the merchant device 302.

Although the engine 500 is illustrated as a distinct component of the e-commerce platform 300 in FIG. 5, this is only an example. An engine could also or instead be provided by another component residing within or external to the e-commerce platform 300. In some embodiments, either or both of the applications 342A-B provide an engine that implements the functionality described herein to make it available to customers and/or to merchants. Furthermore, in some embodiments, the commerce management engine 336 provides that engine. However, the location of the engine 500 is implementation specific. In some implementations, the engine 500 is provided at least in part by an e-commerce platform, either as a core function of the e-commerce platform or as an application or service supported by or communicating with the e-commerce platform. Alternatively, the engine 500 may be implemented as a stand-alone service to clients such as a customer device 350 or a merchant device 302. In addition, at least a portion of such an engine could be implemented in the merchant device 302 and/or in the customer device 350. For example, the customer device 350 could store and run an engine locally as a software application.

The engine 500 could implement at least some of the functionality described herein. Although the embodiments described below may be implemented in association with an e-commerce platform, such as (but not limited to) the e-commerce platform 300, the embodiments described below are not limited to e-commerce platforms.

Example: Cross-Domain Login for Checkout in an Online Store

Figure 6:
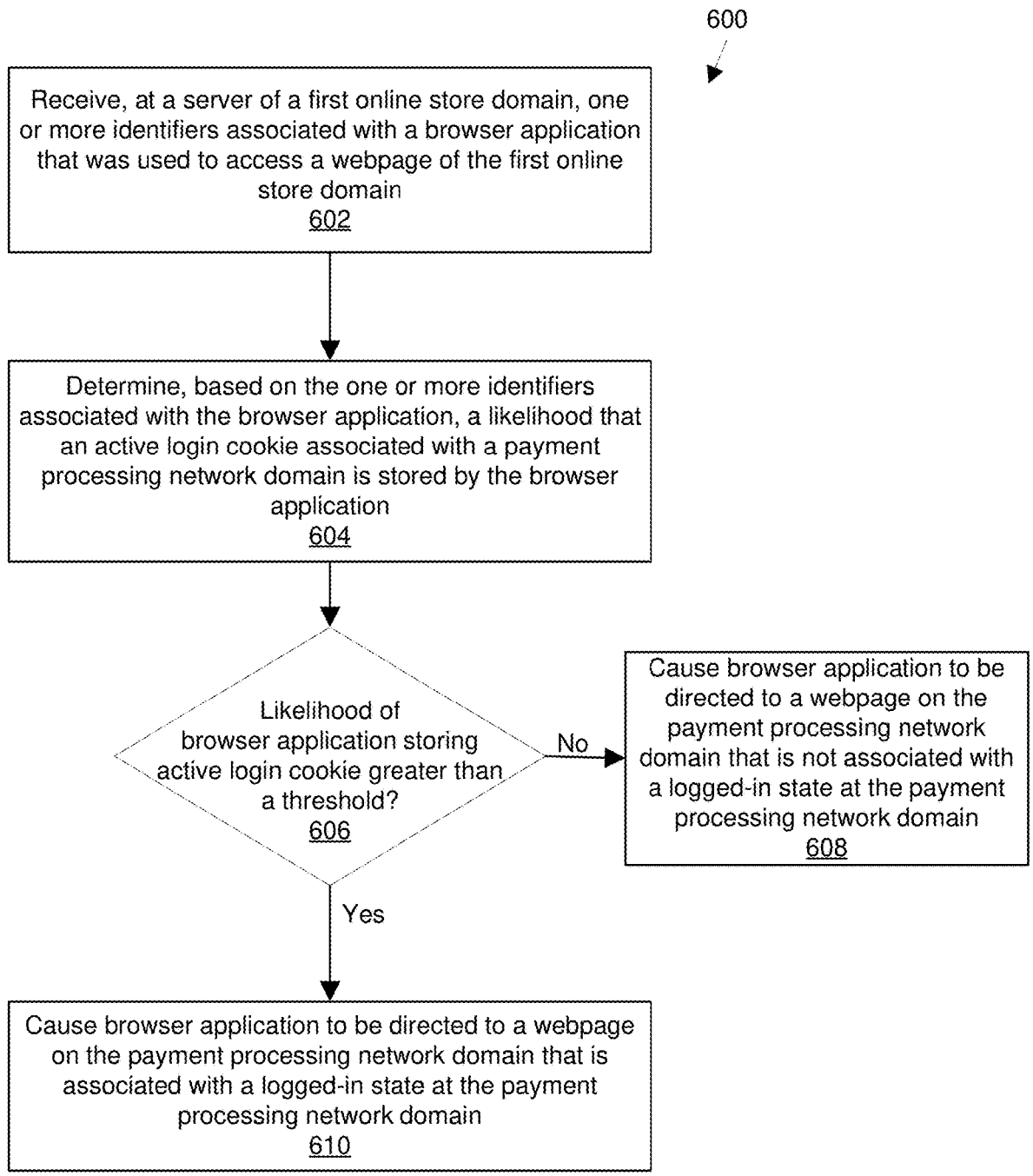
FIG. 6 is a flowchart illustrating a process for facilitating login to a payment processing service, according to some implementations.

In an example use case of the implementations described above, the service network domain operates a payment processing service for multiple online stores, each associated with a tenant network domain. An example process 600 for facilitating login to a payment processing service from online store domains is illustrated in FIG. 6. Aspects of the process 600 can be similar to aspects of the process 200. For example, the process 600 can be performed by a server associated with a first online store domain, which can have functionality similar to the first tenant network domain described in various implementations herein. In the process 600, the first online store domain can interact with a payment processing network domain, which can have similar functionality to implementations of the service network domain described herein. Other implementations of the process 600 include additional, fewer, or different steps, or perform the steps in different orders.

At 602, the server of the first online store domain receives one or more identifiers associated with a browser application that was used to access a webpage of the first online store domain. For example, when the browser application accesses a product listing webpage of the first online store domain, the server receives a user-client string, an IP address, or a user identifier (such as a username linked to a user account, a telephone number, or an email address).

At 604, the server uses the one or more identifiers to determine a likelihood that an active login cookie associated with a payment processing network domain is stored by the browser application. Since the payment processing network domain provides payment processing services to multiple online stores, the user of the browser application may have previously made a purchase through a second online store domain that uses the same payment processing service. Accordingly, the browser application may be storing an active login cookie for the payment processing service if the browser has previously been used to make a purchase through the second online store domain and the user logged in to the payment processing service in order to make the purchase.

At 606, the server determines whether the likelihood of the browser application storing an active login cookie for the payment processing network domain is greater than a threshold. The decision at 606 can be performed in response to an input received in the first online store domain to access a service provided by the payment processing network domain (e.g., a service to process a payment for a good purchased through the first online store). For example, the server can perform the decision at 606 in response to a user's selection of a "checkout" button on a webpage of the first online store domain. Alternatively, the server can make the decision at 606 prior to the user accessing the service network domain, at any point while the browser application is accessing the first online store. For example, the server makes the decision when a user views a product listing webpage on the first online store domain or when the user adds a product to an online shopping cart.

If the result of the decision at 606 indicates that the browser application is not likely to be storing an active login cookie for the payment processing network domain, at 608 the server directs the browser application to a webpage that is not associated with a logged-in state at the payment processing network domain.

Figure 7A:
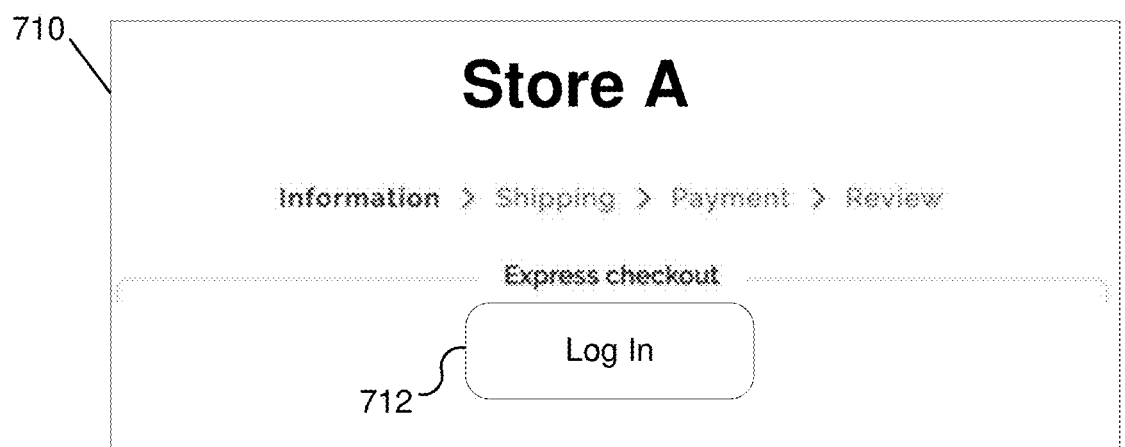
FIG. 7A illustrates an example interface associated with a logged-out state at a service network domain.

FIG. 7A illustrates an example interface 710 associated with a logged-out state at the payment processing network domain, as an example webpage to which the browser is directed at 508. The server can cause the browser application to display the interface 710 in response to a user's selection of a "checkout" button within the online store when the server determines the browser is not likely to be storing an active login cookie for the payment processing service. The interface 710, which can be hosted by the first online store domain, includes an interface element 712 that is selectable to cause the browser application to access a login page for the payment processing network domain. The interface 710 can further include other payment options not illustrated in FIG. 7A, such as an option to select other payment processing services or an option for a user to input payment method information without using the service provided by the payment processing network domain.

Figure 7B:
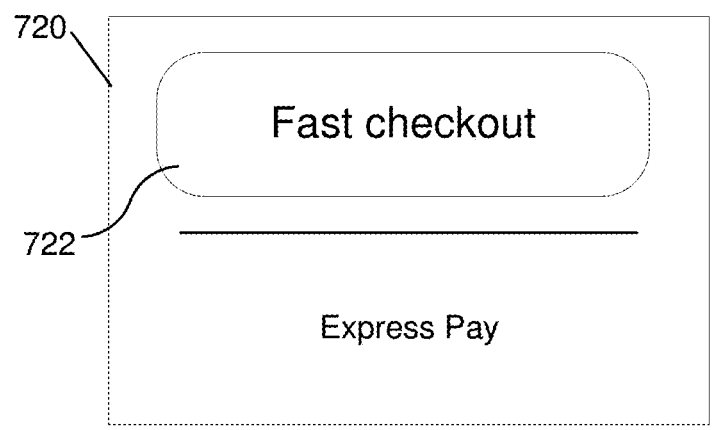
FIG. 7B illustrates an example interface associated with a logged-in state at a service network domain.

Returning to FIG. 6, when the server determines at 606 that the likelihood of the browser application storing an active login cookie for the payment processing network domain is greater the threshold, the server causes the browser application to be directed, at 610, to a webpage on the payment processing domain that is associated with a logged-in state at the payment processing domain. FIG. 7B illustrates an example interface 720 associated with a logged-in state at the payment processing service. Like the interface 710, the example interface 720 can be displayed within a webpage hosted by the first online store domain. For example, the interface 720 can be displayed when a user accesses a webpage to view a list of items the user has added to a shopping cart, as part of the shopping cart webpage or as a modal window associated with the shopping cart webpage. The interface 720 includes an interface element 722 that can be selected to access the payment processing service, bypassing a login page for the service. For example, in response to selection of the interface element 722, the browser application displays a webpage from the service network domain auto-filled with payment details for the user.

Figure 7C:
FIG. 7C illustrates an example payment details webpage generated by a service network domain.

An example payment details webpage 730, which can be displayed in response to selection of the user interface element 722, is shown in FIG. 7C. To display the payment details webpage, which is hosted on the service network domain, the server directs the browser to the payment details webpage at the service network domain. Based on the login cookie stored in the browser application, the service network domain logs into a user account associated with the browser application, obtains payment details from the user account, and populates the webpage 730 for display by the browser application. In some implementations, the server directs the browser application to the payment details webpage 730, instead of the interface 720 depicted in FIG. 7B, when the server determines the browser is likely to be storing an active login cookie for the payment processing service.

Computer System

Figure 8:
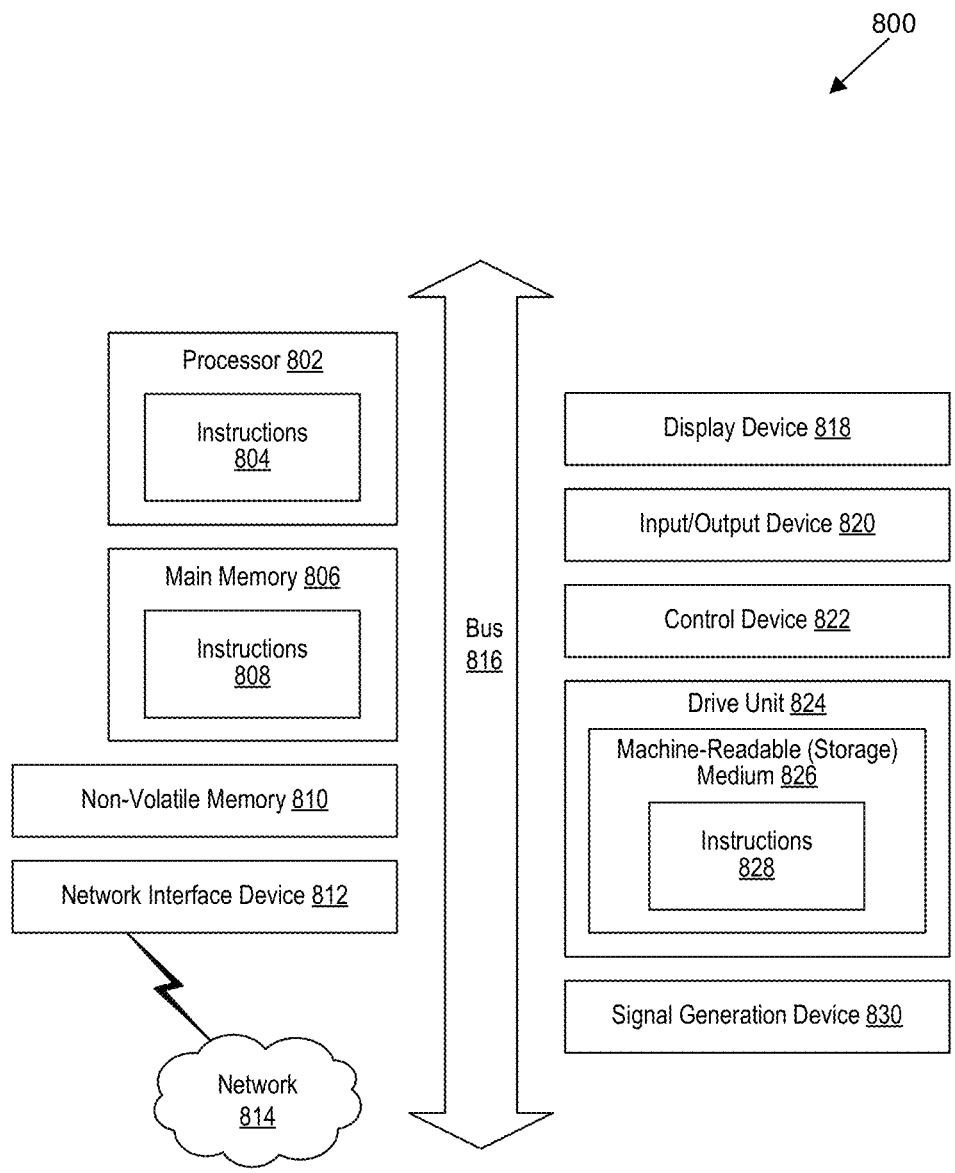
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementation, the computer system 800 can be an embedded computer system, a system-on-chip (SOC), a single-board computer system (SBC) or a distributed system such as a mesh of computer systems or include one or more cloud components in one or more networks. Where appropriate, one or more computer systems 800 can perform operations in real-time, near real-time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A computer-implemented method comprising:
   receiving, at a server of a first tenant network domain, one or more identifiers associated with a browser application executing on a client device that was used to access a webpage of the first tenant network domain;
   determining, at the server based on the one or more identifiers associated with the browser application, a likelihood that an active login cookie associated with a service network domain is stored by the browser application at the client device; and
   responsive to the likelihood exceeding a threshold, causing, by the server, the browser application to be directed to a webpage on the service network domain that is associated with a logged-in state at the service network domain.

2. The computer-implemented method of claim 1, wherein the one or more identifiers comprises a plurality of identifiers associated with the browser application.

3. The computer-implemented method of claim 2, wherein determining the likelihood that the browser application is storing the active login cookie comprises:
   accessing, by the server, a data repository storing identifiers received from data sessions associated with at least a second tenant network domain; and
   identifying a degree of match between the plurality of identifiers associated with the browser application and a subset of the identifiers stored in the data repository.

4. The computer-implemented method of claim 1, wherein the one or more identifiers includes a first user-client string associated with the browser application, and wherein determining the likelihood that the browser application is storing the active login cookie comprises:
   accessing, by the server, a data repository storing a second user-client string received from a data session associated with a second tenant network domain; and
   identifying a match between the first user-client string associated with the browser application and the second user-client string of the second tenant network domain stored in the data repository.

5. The computer-implemented method of claim 4, further comprising, prior to causing the browser application to be directed to the webpage on the service network domain:
   determining the likelihood is greater than the threshold in response to the server identifying the match between the first user-client string associated with the browser application and the second user-client string of the second tenant network domain stored in the data repository.

6. The computer-implemented method of claim 1, wherein the one or more identifiers include:
   an Internet Protocol (IP) address associated with a client device executing the browser application; or
   an identifier of the client device.

7. The computer-implemented method of claim 1, wherein determining the likelihood that the browser application is storing the active login cookie comprises:
   predicting a time that a prior login cookie for the service network domain was stored to the browser application;
   generating an estimated time of expiration for the prior login cookie based on the predicted time of storage of the prior login cookie; and
   determining the prior login cookie is active at a specified time in response to the estimated time of expiration being later than the specified time.

8. The computer-implemented method of claim 1, further comprising:

responsive to the likelihood being less than the threshold, causing, by the server, the browser application to be directed to a login webpage associated with the service network domain.

9. The computer-implemented method of claim 1, further comprising:
responsive to the likelihood being less than the threshold, causing, by the server, the browser application to display an interface element that is selectable to cause the browser application to access a login webpage associated with the service network domain.

10. The computer-implemented method of claim 1, wherein causing the browser application to be directed to the webpage on the service network domain comprises:
receiving an input in the first tenant network domain to access a service provided by the service network domain; and
causing the browser application to be directed to the webpage on the service network domain in response to the received input.

11. A non-transitory computer readable storage medium storing executable instructions, execution of which by a processor causing the processor to:
receive, at a server of a first tenant network domain, one or more identifiers associated with a browser application executing on a client device that was used to access a webpage of the first tenant network domain;
determine, at the server based on the one or more identifiers associated with the browser application, a likelihood that an active login cookie associated with a service network domain is stored by the browser application at the client device; and
responsive to the likelihood exceeding a threshold, cause, by the server, the browser application to be directed to a webpage on the service network domain that is associated with a logged-in state at the service network domain.

12. The non-transitory computer readable storage medium of claim 11, wherein the one or more identifiers comprises a plurality of identifiers associated with the browser application.

13. The non-transitory computer readable storage medium of claim 12, wherein determining the likelihood that the browser application is storing the active login cookie comprises:
accessing, by the server, a data repository storing identifiers received from data sessions associated with at least a second tenant network domain; and
identifying a degree of match between the plurality of identifiers associated with the browser application and a subset of the identifiers stored in the data repository.

14. The non-transitory computer readable storage medium of claim 11, wherein the one or more identifiers includes a first user-client string associated with the browser application, and wherein determining the likelihood that the browser application is storing the active login cookie comprises:
accessing, by the server, a data repository storing a second user-client string received from a data session associated with a second tenant network domain; and
identifying a match between the first user-client string associated with the browser application and the second user-client string of the second tenant network domain stored in the data repository.

15. The non-transitory computer readable storage medium of claim 14, further comprising, prior to causing the browser application to be directed to the webpage on the service network domain:
determining the likelihood is greater than the threshold in response to the server identifying the match between the first user-client string associated with the browser application and the second user-client string of the second tenant network domain stored in the data repository.

16. The non-transitory computer readable storage medium of claim 11, wherein the one or more identifiers include:
an Internet Protocol (IP) address associated with a client device executing the browser application; or
an identifier of the client device.

17. The non-transitory computer readable storage medium of claim 11, wherein determining the likelihood that the browser application is storing the active login cookie comprises:
predicting a time that a prior login cookie for the service network domain was stored to the browser application;
generating an estimated time of expiration for the prior login cookie based on the predicted time of storage of the prior login cookie; and
determining the prior login cookie is active at a specified time in response to the estimated time of expiration being later than the specified time.

18. The non-transitory computer readable storage medium of claim 11, further comprising:
responsive to the likelihood being less than the threshold, causing, by the server, the browser application to be directed to a login webpage associated with the service network domain.

19. The non-transitory computer readable storage medium of claim 11, further comprising:
responsive to the likelihood being less than the threshold, causing, by the server, the browser application to display an interface element that is selectable to cause the browser application to access a login webpage associated with the service network domain.

20. A system comprising:
at least one hardware processor; and
at least one non-transitory memory storing instructions, which, when executed by the at least one hardware processor, cause the system to:
receive one or more identifiers associated with a browser application executing on a client device that was used to access a webpage of a first tenant network domain;
determine, based on the one or more identifiers associated with the browser application, a likelihood that an active login cookie associated with a service network domain is stored by the browser application at the client device; and
responsive to the likelihood exceeding a threshold, cause the browser application to be directed to a webpage on the service network domain that is associated with a logged-in state at the service network domain.

* * * * *